Patented June 24, 1941

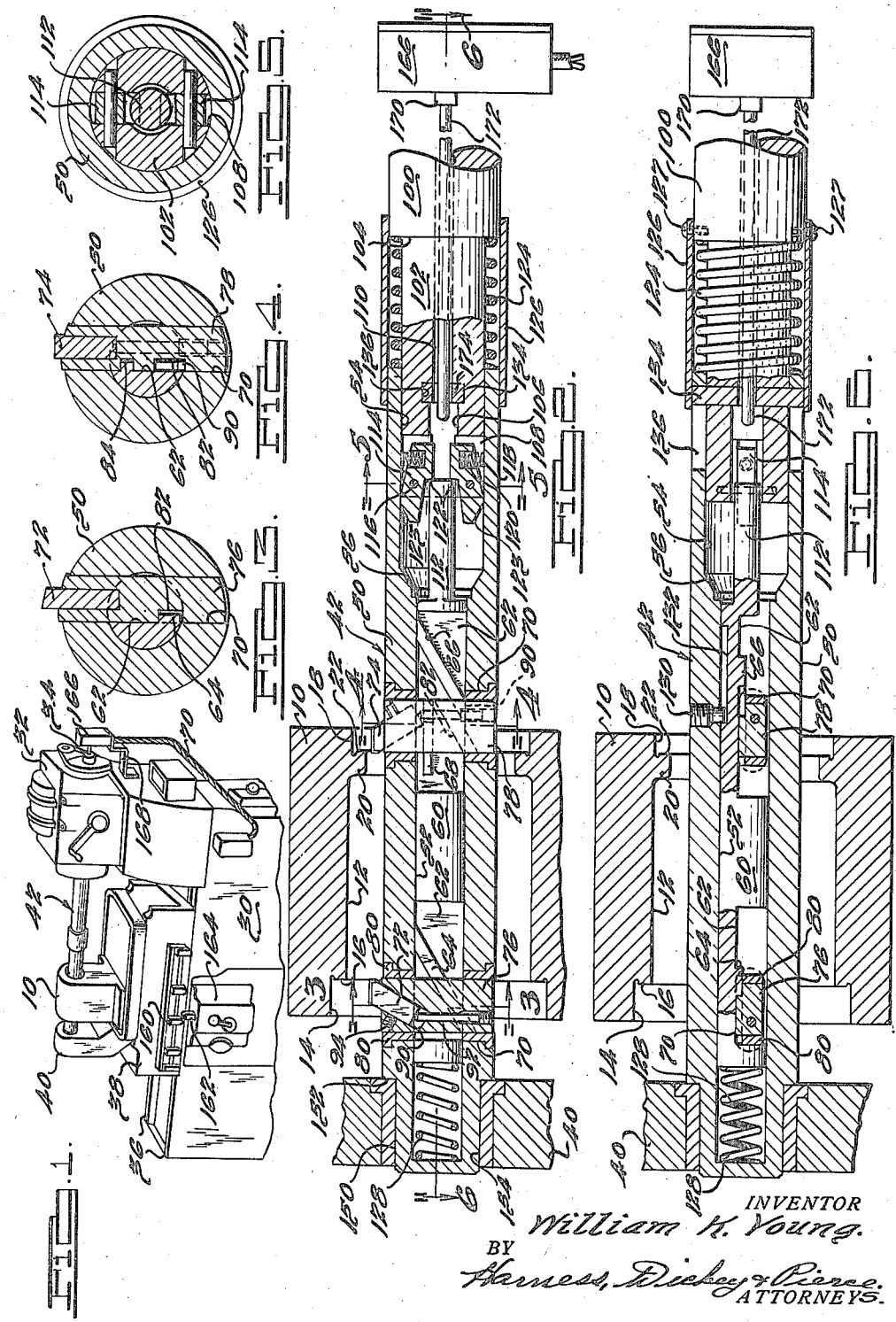

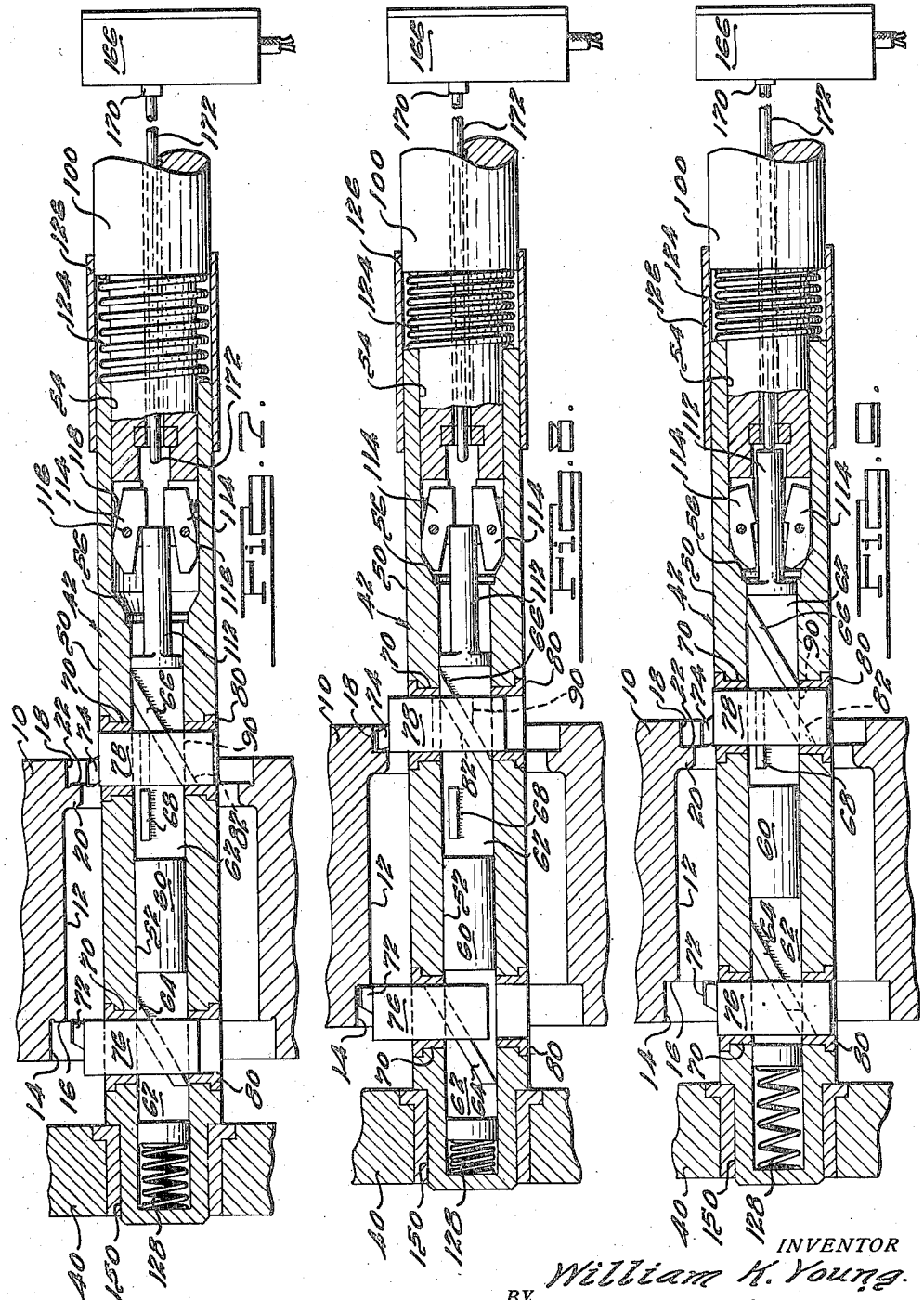

2,247,284

UNITED STATES PATENT OFFICE 2,247,284

BORING TOOL

William K. Young, Detroit, Mich., assignor to Eclipse Counterbore Company, Detroit, Mich., a corporation of Michigan Application March 22, 1939, Serial No. 263,470

15 Claims. (Cl. 77—58)

This invention relates to boring tools and the like and particularly to tools having relative rotation with respect to a piece of work to be machined thereby and including one or more cutter blades projectable and retractable in a generally radial direction with respect to the axis of the tool during normal operation, the principal object being the provision of a tool of this general type that is more or less automatic in operation, that is capable of performing operations not heretofore possible with similar types of tools, and that is positive and efficient in operation.

Objects of the invention include the provision of a tool capable of use as a boring tool and also capable of performing operations not usually considerable within the province of boring tools; the provision of a tool capable of being inserted into a bore in a piece of work and including one or more cutter blades projectable outwardly with respect to the axis of the tool during a normal cutting operation to perform a cutting function and automatically retractable upon the completion of such function; the provision of a tool of the type described which operates automatically and as a result of a relative feeding movement axially of the tool between a tool support and work to automatically project the cutter blade or blades from the tool to effect a cutting operation; the provision of a tool of the type described including relatively movable driving members for effecting a projection of the cutter blade during a normal feeding movement between the tool and a piece of work, together with means for automatically rendering the driving connection between the members inoperative upon completion of a predetermined extent of cutting movement of the cutter blade; the provision of a tool of the type described including a cutter blade projectable away from the axis of the tool at a rate of feed commensurate with a normal machining operation, together with means for effecting a quick return of the cutter blade to inoperative position upon completion of the cutting operation; the provision of a tool of the type described including a cutter blade projectable away from the axis of the tool during a normal cutting operation and a plurality of relatively axially movable members for effecting a feed of the cutter blade during a machining operation together with clutch means for effecting equal feeding movement of the drive members and spring means opposing such feeding movement, together with means for releasing the clutch means upon the completion of a feeding movement whereby to render the spring means effective for returning the cutter blade to inoperative position; and the provision of a tool of the type described that is simple in construction, efficient in operation and relatively economical to build.

Other objects of the invention include the provision of a tool including a body and two or more cutter blades movable outwardly with respect to the axis of the body, together with means for moving the cutter blades through different extents of movement away from the axis of the body during a normal cutting operation; the provision of a tool including a main body and two or more cutter blades movable outwardly with respect to the axis of the tool, including means for effecting outward movement of the cutter blades during a normal feeding movement between a tool spindle and a piece of work so constructed and arranged as to effect movement of one of the cutter blades in advance of another; the provision of a tool of the type described including means for positively controlling movement of the various cutter blades during all stages of the feeding movement between the tool spindle and the work; the provision of a tool of the type described including outwardly movable cutter blades and/or cutter blade carriers and a cooperating axially movable plunger so constructed and cooperating with the cutter blade and/or cutter blade carriers as to effect controlled movement of the cutter blades and/or carriers longitudinally thereof during axial movement of the plunger; and the provision of a tool of the type described including a plurality of generally radially movable cutter blades including a novel form of mechanism for effecting a controlled radial feed of the cutter blades.

Further objects of the invention include the provision of a tool including a body portion and radially movable cutter blades with means for effecting a radial feeding movement of the cutter blade during a normal feeding movement between the tool spindle and the piece of work, together with means for insuring retraction of the cutter blades to inoperative position as a condition precedent to removal of the tool from the work; and the provision of a cutting tool adapted to have a relative rotary movement with respect to a piece of work and including a cutter blade adapted to be fed outwardly away from the axis of the tool during a normal cutting operation resulting from a relative feeding movement axially of the tool spindle with respect to a piece of work, together with safety means insuring retraction of the cutter blade prior to retraction of the tool from the work whereby to eliminate possible damage to the tool, the work or to the machine in which the cutting operation is being performed due to failure of the cutter blade to retract at the completion of its feeding movement.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Fig. 1 is a partially broken, perspective view of a boring mill or machine in which a tool constructed in accordance with the present invention is shown mounted in operative relation with respect to a piece of work;

Fig. 2 is an enlarged, partially broken, sectional view taken in a plane passing axially through the tool shown in the boring machine in Fig. 1, together with a fragment of the machine and of the work being operated upon, the tool being shown with the various parts thereof in the position which they assume after the tool has been introduced into a piece of work with the cutter blades retracted but before the actual feeding movement of the cutter blades with respect to the work has begun;

Fig. 3 is an enlarged sectional view of the tool shown in Fig. 2 taken as on the line 3—3 thereof;

Fig. 4 is an enlarged transverse sectional view of the tool shown in Fig. 2 taken as on the line 4—4 thereof;

Fig. 5 is an enlarged transverse sectional view of the tool shown in Fig. 2 taken as on the line 5—5 thereof;

Fig. 6 is a view similar to Fig. 2 but rotated 90 degrees about the axis of the tool with respect thereto, and taken as on the line 6—6 of Fig. 2;

Fig. 7 is a view similar to Fig. 2 but illustrating the relation of the various parts after the initial or the first phase of movement between the work spindle and the work;

Fig. 8 is a view similar to Fig. 7 but illustrating the relation of the various parts after a further relative feeding movement between the work spindle and the work and showing the relation of the parts when the cutter blades have substantially reached the end of their cutting movement;

Fig. 9 is a view similar to Fig. 8 but illustrating the relation of the parts after a small additional relative feeding movement has occurred between the machine spindle and the work from the position of the parts illustrated in Fig. 8 and upon which the blades have been retracted.

The tool illustrated in the accompanying drawings and to be hereinafter described is termed, for the sake of convenience, a boring tool although strictly speaking it is capable of and in many cases is intended for machining operations that are not boring operations in any sense of the word. For instance the tool may be employed for facing one or both ends of a relatively rotating piece of work having an axial bore through or into which the tool may be projected during a facing operation. However, inasmuch as the tool may also be employed for forming annular grooves in the wall of a bore in a piece of work or may be employed to machine an axially directed shoulder in a bore in a piece of work, and inasmuch as in normal operation it will be employed with work having a bore therein in which the tool will be received, the designation of the same as a boring tool seems appropriate.

A tool constructed in accordance with the practices of the present invention may be provided with a cutter blade which will be projected outwardly away from the axis of the tool at any suitable angle with respect to the axis during a normal feeding movement between the tool, or the tool supporting machine spindle, and the work and in a manner which will be obvious to those skilled in the art once the present invention is made known to them but for the purpose of simplicity in description the illustrative embodiment of the invention shown herein includes cutter blades which are movable in a generally radial direction.

It will additionally be appreciated that a tool constructed in accordance with the present invention may embody one or more cutter blades, but inasmuch as one important feature of the present invention is in connection with selective movement between two or more cutter blades during a normal cutting operation, that is, in effecting projection of the various blades to different extents from the tool during a normal cutting operation, the tool shown by way of illustration has two cutter blades incorporated therewith, and the possibility of incorporating additional blades fed to the same or different extents as compared to the blades shown will be readily appreciated by those skilled in the art. It will also be understood that a tool constructed in accordance with the present invention may have cutter blades which cooperate directly with the axially fed plunger in the body thereof which controls the feeding movement of the blade, or the blades may instead be supported in carriers which in turn cooperate directly with the plunger, this last construction being shown not only by way of general illustration but also to illustrate certain other features of the present invention.

It has been previously mentioned that a tool constructed in accordance with the present invention may be employed for forming one or more grooves in the bore in a piece of work, it may be employed for facing the opposite ends of a piece of work having a bore therethrough, it may be employed for facing radially or otherwise axially directed shoulders in the bore of a piece of work either facing the same or opposite direction, and it may be employed for any combination of such operations. The simultaneous machining of oppositely facing shoulders in the bore of a piece of work being a relatively unusual operation, such an operation, and an illustrative embodiment of the present invention arranged to effect the same, is selected herein for the purpose of describing the present invention. In other words the piece of work 10 illustrated in the drawings is shown as having a bore including a main central portion 12, an enlarged bore portion 14 at one end thereof providing a radial shoulder 16 between it and the bore 12, an opposite cylindrical end bore 18 shown as of slightly smaller diameter than the bore 12, and a radially inwardly directed rib or annular flange 20 between the bores 12 and 18 and forming a radial shoulder 22. The illustrative tool shown is constructed and adapted to simultaneously machine the shoulders 16 and 22.

In machining the work 20 it will be understood that a tool constructed in accordance with the present invention is applicable to any conventional type of boring machine or boring mill, drill press, or the like and regardless of whether the work is fed toward the tool or the tool is fed toward the work and whether the tool or the work is rotated. The particular boring machine illustrated in Fig. 1 and to which a tool constructed in accordance with the present invention is shown adapted by way of illustration includes a base 30 having mounted in fixed relation to one end thereof a head 32 provided with a rotatable spindle 34 in accordance with conventional practice. The upper edge of the base 30 is provided with a pair of parallel slides or ways 36 upon which a table or work support 38 is slidably mounted for movement in a direction parallel to the axis of the spindle 34 and conventional mechanism is provided for effecting a feeding, quick return and/or other movements of the table 38 along the slides 36 in accordance with conventional practice. The piece of work 10 is adapted to be fixedly secured in a suitable or conventional manner to the table 38 and, where necessary or desirable, an outboard bearing such as 40 may be provided for receiving and guiding the extreme outer end of the boring tool which is here indicated generally at 42. The outboard bearing 40 in the particular embodiment shown further acts as an axial stop surface for limiting relative feeding movement between the main body portion of the tool 42 and the work all in a manner which will hereinafter be more clearly described. It will, of course, be understood that the shank end of the tool 42 is suitably received by the spindle 34 in any suitable or conventional manner in concentric relation therewith and drivingly engaged therewith for receiving rotary motion therefrom.

The tool itself includes a generally cylindrical main body portion 50 having an axial cylindrical bore 52 extending from a point adjacent the outer or lefthand end thereof as viewed in the drawings to a point adjacent but materially spaced from the inner or righthand end thereof as viewed in the drawings where it joins the enlarged concentric bore portion 54. At the junction of the bores 52 and 54 an angularly directed shoulder 56, of a shape complementary to the surface of a frustrum of a cone, is provided. The bore 54 continues on through the inner or righthand end of the body 50 as illustrated.

Within the bore 52 a plunger 60 is relatively closely but axially slidably received. As illustrated in the several views and particularly in Figs. 3, 4 and 6, the plunger 60 at axially spaced areas thereof corresponding roughly with the axial spacing of the shoulders 16 and 22 of the work 10 is machined to form a pair of flats or flat surfaces 62 arranged approximately in a plane including the axis of the plunger. On the outermost or lefthand flat 62 an upstanding key 64 is provided and preferably formed integrally with the plunger 60 and is disposed at an acute angle with respect to the axis of the plunger. A similar and equally inclined key 66 is provided on the inner or righthand flat 62. It will be observed that the inner or righthand flat or surface 62 is of greater length than the outer or lefthand flat 62 and beginning at a point aligned with the outer end of the key 66 in a plane disposed perpendicularly to the axis of the plunger 60 and extending outwardly or to the left therefrom, is an additional key 68. The key 68 projects upwardly from the corresponding surface 62 and is preferably formed integrally with the plunger and extends outwardly or to the left therefrom as viewed in the drawings in axially parallel relation with respect to the axis of the plunger 60.

The main body 50 at points in its length corresponding roughly with the axial spacing of the shoulders 16 and 22 and of the flats 62 is provided with a pair of transverse openings 70 therein, shown in this case as generally radially directed with respect to the axis of the tool but, as best illustrated in Figs. 3, 4 and 6, somewhat centrally offset from the axis of the tool so as to enable the proper rake to be provided for the cutter blades during a cutting operation as will be apparent. Also, as previously described, while the cutter blades themselves may be made of a sufficient size and of such shape as to be received directly within the openings 70, in the present case the cutter blades which are here indicated at 72 for the outer or lefthand blade and 74 for the inner or righthand blade, are each shown as being supported in carriers 76 and 78, respectively. The carriers 76 and 78 are of a width to be relatively closely but slidably received in their corresponding openings 70 and may, if desired, be equally closely and slidably received at their inner and outer edges in the openings 70. Preferably, however, removable wear plates 80 are provided in the forward and rear edges of the openings 70 for contacting the forward and rear edges respectively of the carriers 76 and 78 so as to enable replacement of the same from time to time in order to maintain the closeness of fit of the carries in the openings 70. From an inspection of Figs. 3 and 4 it will be observed that one side edge of each of the openings 70 is in alignment with the plane of the corresponding flat 62 so that in practice the blade carriers 76 and 78 in projecting through the body portion 50 and intersecting the bore 52 lies in contact with such flat.

A face of each of the carriers 76 and 78 adapted to contact the corresponding flats 62 of the plunger 60 is provided with a groove or keyway 82 therein of such size and arranged at such an angle as to closely but slidably receive the corresponding key 64 and 66 therein. Additionally the carrier 78 is provided with an additional transverse groove 84 in such face adapted to relatively closely but slidably receive the key 68 therein. Forgetting the key 68 and its corresponding groove 84 for the moment, it will be appreciated that when the keys 64 and 66 are engaged in their respective keyways 82 in the cutter blade carriers, and the plunger 60 is moved axially while maintaining such engagement, the cutter blades 76 and 78 will be moved in the direction of their lengths either one way or another depending upon the direction of movement of the plunger 60. In other words under such condition if the plunger 60 is moved outwardly or to the left as viewed in Fig. 2, the carriers 76 and 78 and consequently the cutter blades 72 and 74, respectively, carried thereby will be caused to move upwardly as viewed in the figure, in other words they will be projected outwardly with respect to the axis of the tool.

However, in the particular piece of work 10 shown by way of illustration the shoulders 16 and 22 are of different effective diameters and because it will be necessary for the forward cutter blade 72 to pass through the bead or flange 20 while the tool is being inserted into the work, it is not possible in practice in machining the particular piece of work illustrated to move both cutter blades 72 and 74 outwardly in a radial direction to the same extent in machining the shoulders 16 and 22. In other words the cutter blade 72 must be projected in a radial direction to a materially greater extent than the blade 74. The construction provided in the present case is such that after the tool is inserted into the work, during initial movement of the plunger 60 relative to the main body 50, the cutter blade 74 and its carrier 78 is held against movement radially of the tool until the cutter blade 72 and its carrier 76 have been projected radially a distance such that the remaining distance required for it to move radially to complete its machining operation is the same as that required in projecting the cutter blade 74 and its carrier 78 from completely retracted position to the full extent of its projected position required to complete its machining operation. As soon as the blade 72 and its carrier 76 has completed its thus described initial or first stage of projecting movement and upon continued movement of the plunger 60 in an outwardly direction, both cutter blades 72 and 74 and their respective carriers 76 and 78 will be fed simultaneously outwardly in a generally radial direction to the full extent of their feeding movement.

The key 68 and its cooperating groove 84 in the carrier 78 are provided in part for obtaining the above described result. Additionally the inner or righthand and lower edge of the groove 82 of the carrier 78 is cut away as indicated at 90 so as to permit the outer or lefthand end of the key 66, during outward movement of the plunger 60, or movement thereof to the left as viewed in the drawings, to move a substantial distance outwardly in the corresponding opening 70 before its upper surface, as viewed in Fig. 2 for instance, contacts the upper surface of the keyway 82 in the carrier 78 and which contact, it will be appreciated, will thereafter cause the carrier 78 to be projected radially of the tool. The length of this cut away portion 90 is such that actual contact of the upper surface of the key 66 with the upper surface of the corresponding keyway 82 in the carrier 78 will occur substantially simultaneously with the complete withdrawal of the key 68 from the keyway 84 in the carrier 78. Thus during the initial outward movement of the plunger 60 during which time the key 64 is operatively engaged with the keyway 82 in the carrier 76 and is effecting radial movement of the carrier 76 and cutter 72, the key 68 is in engagement with the keyway 84 in the carrier 78 and positively locks the carrier 78 against radial displacement. However, at the moment that the carrier 76 and cutter 72 have been projected outwardly from the tool a distance such that the remaining distance which the same is to be projected to complete its feeding movement equals the distance which the cutter blade 74 and its carrier 78 must be projected from fully retracted position to completion of its feeding movement, the key 68 will withdraw from the keyway 84 and the key 66 will become operatively engaged with the keyway 82 in the carrier 76 and will thereafter effect equal and simultaneous outward feeding movement of the cutter 74 and its carrier 78 with the cutter 72 and carrier 76 until the outward feeding or cutting movement of these blades is completed.

From the above it will be understood that in the particular embodiment of the invention illustrated and assuming the cutter blades both to be in fully retracted position, and assuming the tool to be inserted to its full extent into the bore of the work so as to bring the cutter blades 72 and 74 into proper axial position with respect to the work 10, the initial axial movement of the plunger 60 with respect to the body 50 will serve to project the cutter blades 72 while the cutter blade 74 is securely locked against radial displacement, and that after the cutter blade 72 has been projected to a predetermined extent, the cutter blade 74 will be released from its locked relation radially of the tool and thereafter upon continued axial movement of the plunger 60 in the same direction both cutters 72 and 74 will be fed outwardly and to equal extent and equal rates of feed, assuming that the keys 64 and 66 are arranged at the same angularity as is usually preferable.

It has been previously mentioned and it will be obvious to those skilled in the art, that in the broader aspects of the invention it is not necessary to form the cutter blades such as 72 and 74 separately from their carriers 76 and 78, respectively, inasmuch as these parts may be formed as a single piece. However, in such case whenever it became necessary to sharpen one of the cutter blades it would be necessary to also sharpen the remaining one so as to insure the same change in the effective lengths of both of them. This is for the reason that the keys 64 and 66 are fixed with relation to the plunger 60 and the keyways 82 are fixed with relation to the cutter blade carriers and, therefore, any variation in the fully projected position of one of the cutter blades is bound to be duplicated in the other. For this reason it is preferable in some cases at least to employ the separate carriers and separate cutter blades as illustrated. In such case the cutter blades may be adjustably mounted in their respective carriers and while in the broader aspects of the present invention this may be accomplished in any suitable or conventional manner, one convenient construction for accomplishing this result is illustrated in the drawings. For this purpose the carriers 76 and 78 are each provided in their outer end face with a blind opening 90 therein as best illustrated in Fig. 2, this opening being of a cross-sectional size and configuration such as to slidably but relatively closely receive the corresponding cutter blade 72 or 74 therein. While the axis of the openings 90 may be disposed at any desired angle with respect to the longitudinal center line of the respective carrier as best suits the particular operation to be performed by the tool, these openings are illustrated in the present case as being disposed with their center lines at an acute angle to the center line of the corresponding carrier as illustrated. A pin 92 having a threaded outer end is projected through an opening in the inner end face of each of the cutter carriers and extends from such end into the inner end of the corresponding opening 90 where it abuts against the inner end of the corresponding cutter blades 72 or 74 and serves as a stop for inward movement thereof. The threaded outer end of such pin 92 is threadably received in the outer end of its cooperating opening in the carrier so that upon rotating the pin 92 the position of the opposite or stop end thereof may be varied with respect to the opening 90 and thus effect a control of the innermost position of the cutter blade 72 in the opening 90. A set screw 94 threaded through the cutter blade carrier is adapted to engage a side of the cutter blade therein for firmly locking it in its adjusted position with respect to the carrier. By this means each of the cutter blades 72 and 74 may be independently adjusted after resharpening, replacement or the like to bring it into a desired or predetermined relation with respect to the other cutter blade.

In order to effect axial movement of the plunger 60 to obtain the controlled movements of the cutter blades 72 and 74 as above described, the following mechanism is provided. A cylindrical shank member 100 whose inner or right-hand end, not shown, is formed in a suitable or conventional manner for reception and securement in the outer end of the spindle 34 of the boring machine, for instance in the same manner that any boring tool is secured in a spindle, is provided with a cylindrical outer end portion 102 of smaller diameter than the main body portion thereof so as to form a shoulder 104 at its junction with the main portion of the shank. The end portion 102 is of a diameter to be and is relatively closely and slidably received within the enlarged bore portion 54 of the main body portion 50 and the outer end of the end portion 102 is provided with an axial bore 106 opening onto such outer end and is also provided with a diametrical slot 108. In the particular embodiment shown the shank member 100 is further provided with a smaller concentric bore 110 which extends from the inner end of the bore 106 completely through the shank member and through the inner end thereof where it opens into the usual bore of the spindle 34.

The inner or righthand end of the plunger 60 is reduced in diameter as at 112 sufficiently to permit it being received in the bore 106 of the shank 100 in which it is slidably received. A dog 114 is relatively loosely received in the slot 108 on each side of the bore 106 and each is supported for pivotal or rotatable movement in the slot by means of a transversely extending pin 116 carried by the outer end of the shank end 102 and bridging the slot 108. A compression spring 118 is received in a pocket 120 in each of the dogs 114 and is maintained under compression between the bottom of such pocket and the wall of the bore 54 in the main body portion 50, these springs constantly urging the inner or righthand ends of the dogs 114 in a generally radially inward direction, the extent of inward projection being limited by the opposite end portions of the dogs bearing against the wall of the bore 54 as illustrated in Fig. 2 and corresponding views in the drawings. The inner end of each of the dogs 114 is formed to provide a shoulder 122 at the inner edge thereof and facing in a generally axially outward direction as shown, such shoulders being projected into the bore 106 under the influence of the springs 118 and in which position they intersect the path of movement of the inner end 112 of the plunger 60 in the bore 106. The axially and radially outer ends of the dogs 114 are beveled off as at 123 for cooperation with the beveled surface 56 as will hereafter be more fully described. With the construction thus far described it will be appreciated that as the shank member 100 is moved axially to the left with respect to the main body 50, as viewed in the drawings, with its end portion 102 received within the bore 54, the shoulders 122 of the dogs 114 will engage the inner or righthand end of the portion 112 of the plunger 60 and will carry the plunger 60 to the left with the shank member relative to the main body portion 50.

A coiled spring 124 surrounding the end 102 of the shank member 100 and maintained under compression between the shoulder 104 and the inner end of the main body portion 50 constantly urges the main body portion 50 outwardly or to left as viewed in the drawings with respect to the shank member 100. Preferably a sleeve such as 126 surrounds the adjacent portions of the shank member 100 and the main body portion 50 to serve as a dust cover for the spring 124 and the bearing surfaces of the tool beneath the same, the sleeve 126 being fixed with respect to either the shank member 100 or the main body portion 50 and being slidably received by the other thereof so as to permit relative movement between these parts. As a matter of illustration the sleeve 126 is shown fixed to the shank 100 by screws 127 as shown in Fig. 6. Additionally a coiled spring 128 is normally maintained under compression in the outer end of the bore 52 and between the blind end of such bore and the outer end of the plunger 60, and constantly urges the plunger 60 inwardly or to the right as viewed in the drawings.

Movement of the plunger 60 inwardly or to the right as viewed in the drawings under the influence of the spring 128 is limited by means of a dog end screw 130, illustrated in Fig. 6, which is projected through the wall of the main body portion 50 and into the bore 52 where the dog end thereof is slidably received in a slot 132 formed in the surface of the plunger 60 and extending longitudinally thereof. Movement of the shank member 100 inwardly or to the right as viewed in the drawings with respect to the main body portion 50 is limited by means of a bar member 134 relatively closely received in a diametrical slot 136 in the outer end portion 102 of the shank member 100 at the inner end of the bore 106, the opposite outer ends of the bar member 134 projecting outwardly into an elongated diametrical slot 136 formed in the inner end of the main body portion 50 in which such ends are received for sliding movement axially of the main body portion 50.

In performing a machining operation with a tool thus described the tool is introduced into a bore in a piece of work by a relative feeding movement between the tool and work until the cutter blades 72 and 74 are properly positioned in the work and then inward movement of the main body portion 50 with respect to the work is stopped while continued inward movement of the shank member 100 is permitted in order to effect relative longitudinal movement of the plunger 60 with respect to the main body portion 50 and, therefore, radial projection of the cutter blades 72 and 74 for the purpose of effecting a machining operation. While the stopping of such relative inward movement of the main body portion 50 with respect to the work 10 may be accomplished in a number of different ways, as for instance in a manner similar to that illustrated in my co-pending application for Letters Patent of the United States for improvements in Boring tools filed on even date herewith and serially numbered 263,469, the means provided in the particular embodiment shown consists of reducing the outer end portion of the main body portion 50 as at 150 to form an axially outwardly directed shoulder 152. The outboard bearing 40 carried by the machine table 38 and fixed with respect thereto and to the work 10 is provided with a bushed opening 154 therein in which the end 150 of the body 50 is relatively closely received and guided when the tool is moved into operative position with respect to the work 10 and the inner or righthand face of which engages the shoulder 152 of the tool and thereby limits movement of the main body portion 50 outwardly or to the left as viewed in the drawings to a position in which the cutter blades 72 and 74 are properly positioned axially of the bore in the work 10 for the particular machining operation shown.

It will be understood that in carrying out a normal machining operation with the illustrative embodiment of the invention shown and with the particular boring machine and piece of work shown by way of illustration, the table 38 will initially be withdrawn to the left, as viewed in Fig. 1, sufficiently to permit complete withdrawal of the tool 42 from the outboard bearing 40 and the particular piece of work 10 that may have been previously mounted in the machine, and a new piece of work 10 is then located and fixed in its predetermined position upon the table 38. When this is accomplished the table 38 is then fed toward the head 32 so as to project the outer end of the tool 42 through the bore in the piece of work and so as to bring the end 150 of the main body of the tool into received relation with respect to the opening 154 in the outboard bearing 40. Strictly speaking this initial movement of the table 38 is not a feeding movement but rather a quick traverse movement inasmuch as it will normally occur at a rate of speed substantially in excess of a normal feeding movement. Preferably shortly prior to actual contact of the shoulder 152 with the outboard bearing 40 this quick traverse movement will stop and the table 38 will then be advanced toward the head 32 at a normal feeding rate, or at least a slower rate of movement, so that the shoulder 152 will be brought up against the inner face of the outboard bearing 40 without a material shock or jar. At such time the various parts of the tool 42 will be in the relative position illustrated in Figs. 2 and 6.

As the above described feeding movement of the table 38 with respect to the head 32, and consequently of the tool 42 with respect to the work 10, is continued, contact of the shoulder 152 with the outboard bearing 40 will prevent further relative feeding movement between the main body 50 of the tool and the work 10, and thereafter during a continuation of this normal feeding movement a relative axial movement between the shank member 100 and main body portion 50 will occur, the bar member 134 moving outwardly in the slot 136 in the main body member 50 during this phase of movement. During this phase of operation the dogs 114 will, of course, be carried axially outwardly with respect to the main body portion 50 simultaneously with the shank portion 100 and, because the shoulders 122 thereof are engaged over the inner end of the portion 112 of the plunger 60, they will cause the plunger 60 to be moved outwardly with respect to the main body portion at a speed corresponding with the speed of the shank member 100 with respect to the main body portion 50, the dog end screw 130 moving in a relatively inwardly direction in the slot 132 with respect to the plunger 60.

As previously explained this particular phase of movement in which shank member 100 and plunger 60 are moved in a relatively outward direction, or to the left as viewed in the drawings, with respect to the main body portion 50, occurs in two steps. The first of these is that in which the key 68 is engaged in the groove 84 of the cutter blade carrier 76 and, therefore, holds the same against radial displacement while the carrier 76 is being projected radially with respect to the axis of the tool. The second step occurs after the carrier 76 has been projected a predetermined amount upon which the key 68 withdraws from the slot 84 of the carrier 76 and the rear key 66 becomes operatively engaged with the groove 82 in the rear carrier 78 and thereafter causes the carrier 78 and its cutter blade 74 to be advanced simultaneously with the carrier 76 and its cutter blade 72. During this last step the cutter blades 72 and 74 advance into contact with the shoulders 16 and 22, respectively, of the work 10 and machine these shoulders in a relative facing operation. The relation of the various parts of the tool at the end of such first step of movement is illustrated in Fig. 7 and the relation of the various parts of the tool near the end of such second step of movement is illustrated in Fig. 8.

Referring now to Fig. 8 in which relative outward movement of the shank member 100 and plunger 60 with respect to the main body portion 50 is substantially completed, it will be noted that the beveled ends 123 of the dogs 114 have contacted or are almost in contact with the beveled shoulder 56 formed interiorly of the main body 50 between the bores 52 and 54. When the forward ends of the dogs 114 contact the beveled shoulder 56 as illustrated in Fig. 8 it will be appreciated that further relative feeding movement between the shank 100 and plunger 60 with respect to the main body portion 50 will cause the outer or lefthand ends of the dogs 114 to be cammed inwardly with respect to the axis of the tool and that this movement of the dogs 114 will act to withdraw the shoulders 122 thereof outwardly with respect to the inner or righthand end of the part 112 of the plunger 60. It will be further appreciated that when the dogs 114 have thus been pivoted a predetermined amount, at which time the cutter blades 72 and 74 will have been projected to the maximum extent desired to face the shoulders 16 and 22, respectively, the shoulders 122 of the dogs 114 will be drawn outwardly out of interengaging relationship with respect to the inner or righthand end of the part 112 of the plunger 60 and thus release the plunger 60 to movement inwardly or to the right with respect to both the main body portion 50 and the shank member 100 under the influence of the spring 128, the inner end 112 of the plunger 60 under such circumstances being projected between the dogs 114 further into the bore 106 as illustrated in Fig. 9.

As soon as the plunger 60 has been released from the dogs 114 as illustrated in Fig. 9, or shortly thereafter, the feed of the table 38 toward the head 32 of the boring machine is caused to be reversed and preferably this reversal in the direction of the movement of the table 38 is also a quick return or traverse movement. Due to the force of the spring 124, during the first part of such reversing movement the shoulder 152 of the main body portion 50 will continue to be pressed against the outboard bearing 40 while the shank portion 100 is being withdrawn or retracted from the work, and will remain so pressed against the outboard bearing 40 until the bar member 134 contacts the rear end of the slot 136, upon the occurrence of which the main body portion 50 will be withdrawn equally with the shank member 100 and thus be withdrawn from the bore in the work. During this withdrawing movement of the tool from the work, the inner or movement of the plunger 60 to the right as viewed in the drawings will be limited by the dog end screw 130 contacting the outer end of the groove 132 in the plunger 60. The position in which the dog end screw 130 stops the inward movement of the plunger 60 is such that after the bar member 134 begins to move inwardly or to the right in the slot 136, the end 112 of the plunger 60 is withdrawn in a relative outward direction from the position in which it is shown in the bore 106 in Fig. 9, toward the position illustrated in Fig. 2 for instance, and during which movement the inner or righthand end of the part 112 of the plunger 60 will be moved outwardly with respect to the shoulders 122 of the dogs 114 until it passes axially beyond such shoulders, upon the occurrence of which the springs 118 will move the dogs 114 to bring the shoulders 122 again over the inner end of the part 112 and so condition the tool for repetition of the above described movements.

Although not essential to the practices of the present invention it may be desirable, particularly in some instances, to make provisions for insuring retraction of the cutter blades 72 and 74 under the influence of the spring 128 prior to reversal of the feeding movement of the machine tool in which the boring tool is being used. It will be appreciated that if such a reversal should occur while the cutter blades are in the expanded condition illustrated in Fig. 8, for instance, the interference existing between the work and the cutter blades to axial movement of the tool might cause the work, the tool, or even the machine itself to be damaged or even wrecked, particularly when it is understood that this reversal movement is usually effected at a relatively fast rate of speed. Failure of the cutter blades 72 and 74 to retract under the influence of the spring 128 might possibly occur for instance where excessive wear has developed between the carriers 76 and 78 and their respective openings in the tool permitting dust, dirt or other foreign matter to wedge itself between the carriers and the surfaces of their guiding openings in the main body portion 50.

One feature of the present invention provides a novel means for preventing withdrawal of the tool from the work before the cutter blades are moved to fully retracted position and is such that retraction of the cutter blades to fully retracted position is a condition precedent to withdrawal of the tool. In the particular type of machine illustrated in Fig. 1 the reversal of movement of the table 38 from a feeding movement toward the head 32 is controlled by means of an adjustable stop such as 160 carried by the table 38 and adapted to contact with and operate a conventional depressible member such as 162 of a control box such as 164 during a feeding movement of the table 38. It is assumed for the purpose of illustration that in the particular machine illustrated in Fig. 1 the various movements of the table 38 and the slide 36 are accomplished hydraulically by means of a conventional cylinder and piston and an electrically operated control valve of conventional construction not shown, the operation of the latter being controlled by the member 162. According to this particular phase of the present invention, in such case an electrical switch illustrated generally at 166 in Fig. 1 and other views of the drawing is mounted upon the outer end of the head 32 by means of a bracket 168, and this switch is connected by means of suitable leads 170 in series with the electrical control for reversing the feeding movement of the table 38. As illustrated best in Figs. 2 and 6 to 9, inclusive, the switch 166 is provided with an operating plunger 168 normally spring pressed outwardly to open circuit position. Accordingly, it will be appreciated that with this arrangement it will be necessary to move the plunger 168 inwardly with respect to the housing for the switch 166 to close the reversing circuit and permit return of the table 38 and the work carried by it to an unloading and loading position.

The switch 166 is so supported by the bracket 168 that the plunger 170 thereof is aligned with and faces the axis of the spindle 34. A small rod 172 is located in the bore of the spindle 34 and extends outwardly at one end through the bore 110 in the shank member 100 of the tool 42 and such outer end projects through an opening 174 in the bar 136 and into the inner end of the bore 106. The opposite end of the rod 172 extends into substantially contacting relation with respect to the plunger 170 of the switch 166. When the shoulders 122 of the dogs 114 are engaged behind the inner end of the shank portion 112 of the plunger 60, such end of the shank portion 112 is located in spaced relation with respect to the outer end of the rod 172 and consequently the spring pressed plunger 170 is enabled to move to projected or open circuit position. However, after the dogs 114 have released the plunger 60 for inward movement under the influence of the spring 128, as illustrated in Fig. 9, the shank end 112 of the plunger 60 is projected inwardly where it contacts the adjacent end of the rod 172 and moves the rod 172 axially inwardly, or to the right as viewed in the drawings. The force of the spring 128 is superior to the force constantly urging the switch plunger 170 toward projected position and thus overcomes such force in the switch and causes the switch plunger 170 to be projected inwardly as illustrated in Fig. 9 in which position of the switch plunger the switch 166 is moved to closed circuit position, thus permitting the electrical switch controlling the reversing movement of the table 38 to operate and thus cause a withdrawal of the table 38.

It will be appreciated that with the construction described that the occurrence of any circumstance which would prevent the cutter blades 72 and 74 from retracting at the end of any cutting operation, such refusal of the cutter blades to retract will prevent inward withdrawal of the plunger 60 and consequently the end 112 of the plunger 60 will not be able to contact the rod 172 so as to condition the machine for a reversing movement of the table 38. Under such conditions upon refusal of the table 38 to move in a reversing direction upon completion of a cutting operation, suitable precautions may be taken to cause the cutter blades 72 and 74 to retract and thereby enable the reversal of movement of the table 38 to occur, but it will be observed that under no condition with this arrangement, could such reversal occur while the cutter blades were expanded and result in serious damage of the tool, the work, or to the machine itself.

It will be appreciated that the single embodiment of the invention herein shown is merely illustrative of a wide variety of constructions to which the principles of the present invention are applicable and, accordingly, it will be understood that formal changes may be made in the specific embodiment of the invention described without departing from the spirit or substance of the broad invention, the scope of which is commensurate with the appended claims.

What I claim is:

1. In a tool of the class described, in combination, a main body portion having a bore therein and an opening extending transversely therethrough, a plunger axially reciprocably received in said bore, a cutter blade guided for movement in said opening and being projectable and retractable with respect to the axis of said main body portion, means interconnecting said cutter blade and plunger for effecting simultaneous movements thereof in the direction of their respective lengths, means for supporting said main body portion movable axially with respect thereto, a releasable connection between said supporting member and said plunger for effecting equal axial movement of said plunger with said supporting means in one direction, and means cooperable with said connection during relative axial movement between said supporting member and said main body member for moving it to released position.

2. In a tool of the class described, in combination, a main body portion having a bore therein and an opening extending transversely therethrough, a plunger axially reciprocably received in said bore, a cutter blade guided for movement in said opening and being projectable and retractable with respect to the axis of said main body portion, means interconnecting said cutter blade and plunger for effecting simultaneous movements thereof in the direction of their respective lengths, means for supporting said main body portion movable axially with respect thereto, a releasable connection between said supporting member and said plunger for effecting equal axial movement of said plunger with said supporting means in one direction, means cooperable with said connection during relative axial movement between said supporting member and said main body member for moving it to released position, and means cooperating with said plunger for moving it axially relative to said supporting member upon release of said connection.

3. In a tool of the type described, in combination, a main body portion, a cutter blade supported thereby for movement in a direction transverse to the length thereof, a member supported for movement axially of said main body portion cooperating with said blade to control the position of the same transversely of said main body portion, a second member movable axially with respect to said main body portion, an automatically releasable connection forming an axial drive connection between said members, and independent spring means normally acting against each of said members urging said members toward movement in the same direction.

4. In a tool of the class described, in combination, a cutter supporting member, a cutter blade supported thereby for movement in a direction transverse to the length thereof, a cutter controlling member movable axially with respect to said member and cooperating with said blade to control the position of the same transversely of said supporting member, a rotatable driving member movable axially of said supporting member, automatically releasable means forming an axial drive connection between said blade controlling member and said driving member, and means for moving said blade controlling member axially with respect to both said supporting member and said driving member upon release of said automatically releasable means.

5. In a device of the class described, in combination, a main body member, a cutter carried by said main body member and movable transversely to the length thereof, means movable axially of said main body member operatively connected to said cutter for simultaneous movement therewith in the direction of their respective paths of movement, a rotatable driving member for said cutter controlling member movable axially with respect to said main body member, means interconnecting said driving member and said cutter controlling member for equal axial movement in one direction including a movably mounted dog on said driving member drivingly engageable with said cutter controlling member, spring means constantly urging said cutter controlling member in a direction to radially retract said cutter, and means for releasing said dog from driving engagement with said cutter controlling member during relative axial movement between said driving member and said main body member whereby to allow said spring means to retract said cutter.

6. In a tool of the class described, in combination, a main body member having a bore and an opening therethrough transversely of said bore, a plunger movable axially of said bore, a cutter blade movable longitudinally of said opening, means interconnecting said cutter blade and plunger for simultaneous movement in the direction of their respective lengths, a spring constantly urging said plunger toward one limit of its movable position, means limiting movement of said plunger under the influence of said spring, a driving member movable axially with respect to said main body member, spring means constantly urging said driving member toward one limit of its movable position with respect to said main body member, means limiting relative axial movement between said main body member and said driving member under the influence of the last mentioned spring, and an automatically releasable connection between said driving member and said plunger for effecting equal axial movement of said plunger with said driving member in opposition to the force of the first mentioned spring during a predetermined movement of said supporting member relative to said main body portion.

7. In a tool of the class described, in combination, a main body portion, a pair of cutters supported thereby for movement in a direction transversely to the axis thereof, a cutter controlling member movable axially with respect to said main body portion, and means interconnecting said cutter controlling member and said cutters so constructed and arranged as to effect movement of one of said cutters longitudinally of its corresponding opening in advance of movement of the other of said cutters longitudinally of its corresponding opening during continued movement of said cutter controlling member in one direction.

8. In a tool of the class described, in combination, a main body member having a bore and a pair of openings therethrough extending transversely with respect to the axis thereof, a cutter blade mounted for movement longitudinally of each of said openings, a plunger reciprocably mounted in said bore, means forming a connection between one of said cutters and said plunger for effecting simultaneous movement of said cutter longitudinally of its corresponding opening simultaneously with movement of said plunger axially of said main body portion, and means forming a connection between the other of said cutter blades and said plunger operative during one phase of movement of said plunger longitudinally of said main body portion to effect simultaneous movement of said other cutter blade longitudinally of its corresponding said opening and ineffective during another phase of relative movement between said plunger and said main body portion to effect movement of said other blade in its corresponding said opening.

9. In a tool of the class described, in combination, a main body portion, a pair of cutters supported thereby for movement transversely with respect to the axis thereof, a cutter controlling member movable axially with respect to said main body portion, means forming an operative connection between said cutter controlling member and one of said cutters for effecting simultaneous movement of said cutter and said cutter controlling member in the direction of their respective paths of movement, means forming an operative connection between the other of said cutters and said cutter controlling member for effecting simultaneously movement of said other cutter and said plunger during a predetermined axial movement of said plunger with respect to said main body portion, and means associated with the last mentioned connecting means positively locking said other cutter against movement in the direction of its normal movement during another predetermined phase of movement of said cutter controlling member axially of said main body portion and while simultaneously effecting movement of the first mentioned cutter in the direction of its normal movement with respect to the axis of said main body portion.

10. In a tool of the class described, in combination, a main body portion having a bore and a pair of openings therein extending transversely with respect to the axis thereof, a plunger reciprocable in said bore, a cutter carrier reciprocable in each of said openings, a key disposed obliquely with respect to the axis of said plunger fixed with respect to said plunger adjacent each of said openings and movable into intersecting relation with respect to said openings, said carriers each provided with a keyway therein for reception of the corresponding of said keys whereby when said keys are operatively engaged in said keyways movement of said plunger axially of said main body portion effects simultaneous movement of said carriers longitudinally of their respective openings, and said keys and keyways being so constructed and arranged that one of said keys is operatively engaged with respect to its corresponding keyway in advance of operative engagement of the other of said keys with its corresponding keyway during movement of said plunger in the same direction with respect to said main body portion.

11. In a tool of the class described, in combination, a main body portion having a bore and a pair of openings therein extending transversely with respect to the axis thereof, a plunger reciprocable in said bore, a cutter carrier reciprocable in each of said openings, a key disposed obliquely with respect to the axis of said plunger fixed with respect to said plunger adjacent each of said openings and movable into intersecting relation with respect to said openings, said carriers each provided with a keyway therein for reception of the corresponding of said keys whereby when said keys are operatively engaged in said keyways movement of said plunger axially of said main body portion effects simultaneous movement of said carriers longitudinally of their respective openings, said keys and keyways being so constructed and arranged that one of said keys is operatively engaged with respect to its corresponding keyway in advance of operative engagement of the other of said keys with its corresponding keyway during movement of said plunger in the same direction with respect to said main body portion, and means cooperating between said plunger and the last mentioned carrier positively locking said carrier against movement longitudinally of its respective opening prior to operative engagement of its corresponding key with its corresponding keyway during said movement of said plunger.

12. In a tool of the class described, in combination, a main body portion having a bore and a plurality of openings therethrough extending transversely with respect to the axis thereof, a plunger reciprocably mounted in said bore, a cutter carrier reciprocably mounted in each of said openings, a key and keyway connection between said plunger and each of said carriers for causing related movements thereof, each of said carriers having an opening therein, a cutter blade received in each of said openings, an adjustable stop projectable into each of said openings for engagement with the corresponding said cutter blades to control the longitudinal position thereof in the corresponding said opening, and means associated with each of said carriers for locking the corresponding said cutter blade in its adjusted position in the corresponding said openings in said carriers.

13. In a tool of the class described, in combination, a main body and a cutter blade supported thereby adapted to be projected into a bore in a piece of work to perform a cutting operation, means including a member positively movable relative to said main body member associated with said main body and said cutter blades operable to positively project said cutter blades outwardly away from the axis of said main body in the performance of a cutting operation, and means associated with the last mentioned means establishing retraction of said cutter blade from projected relation with respect to said main body as a condition precedent to withdrawal of said main body and cutter from said work.

14. In a machine of the class described, in combination, a spindle, a work support, means for effecting relative movement between said support and spindle, a tool supported in fixed relation with respect to said spindle including a main body portion, a cutter blade carried by said main body portion and projectable and retractable with respect to the axis thereof, means associated with said main body portion and said cutter for effecting a projecting movement of said cutter blade during relative movement between said table and said spindle, means for automatically effecting a reversal of the movement between said spindle and said work support, and means forming a connection between the second and third mentioned means operable only upon retraction of said cutter blade to render said third mentioned means operative for effecting said reversal.

15. In a machine of the class described, in combination, a driving spindle, a work support, means for effecting relative movement between said work support and said spindle, a tool drivingly engaging said spindle and relatively movable therewith with respect to said work support including a main body portion having a bore, a cutter blade supported by said main body portion for movement toward and away from the axis of said main body portion, a plunger in said bore, a connection between said plunger and said cutter blade so constructed and arranged as to cause simultaneous movement of said plunger and cutter blade in the direction of their respective paths of movement, means for positively moving said plunger in one direction axially of said main body portion, spring means constantly urging said plunger in the opposite direction axially of said main body portion, a normally open switch, a connection between said switch and said plunger operable to move said switch to closed circuit position only upon movement of said cutter blade to its retracted position with respect to the axis of said main body portion, and an operative connection between said switch and the first mentioned means.

WILLIAM K. YOUNG.